(12) United States Patent
Shimahara

(10) Patent No.: US 6,239,571 B1
(45) Date of Patent: May 29, 2001

(54) RESOLVER

(76) Inventor: Shiro Shimahara, 2619-5, Ooaza Ueda, Ueda-shi, Nagano-ken, 386-1102 (JP)

( * ) Notice: Subject to any disclaimer, the term of this patent is extended or adjusted under 35 U.S.C. 154(b) by 0 days.

(21) Appl. No.: 09/455,491

(22) Filed: Dec. 6, 1999

(30) Foreign Application Priority Data

Apr. 2, 1999 (JP) .................................................. 11-096361

(51) Int. Cl.$^7$ .................................................. G05F 19/31
(52) U.S. Cl. ................... 318/605; 318/654; 340/870.18; 310/12
(58) Field of Search .................................... 318/605, 654; 310/12, 168, 170; 340/870.31, 870.18

(56) References Cited

U.S. PATENT DOCUMENTS

| | | | |
|---|---|---|---|
| 4,144,519 | * | 3/1979 | Chamuel ............................ 340/16 R |
| 4,705,971 | * | 11/1987 | Nagasaka ............................... 310/12 |
| 4,857,926 | * | 8/1989 | Neglia et al. ......................... 341/116 |
| 4,893,071 | * | 1/1990 | Miller .................................. 324/660 |
| 5,003,260 | * | 3/1991 | Auchterlonie ................... 324/207.16 |
| 5,150,115 | * | 9/1992 | DeJong et al. .................. 340/870.31 |
| 5,763,976 | * | 6/1998 | Huard .................................... 310/168 |

FOREIGN PATENT DOCUMENTS

| | | |
|---|---|---|
| B2-59-17781 | 4/1984 | (JP) . |
| 62-144021 | 6/1987 | (JP) . |

\* cited by examiner

*Primary Examiner*—Robert E. Nappi
*Assistant Examiner*—Ritor Leykin
(74) *Attorney, Agent, or Firm*—Birch, Stewart, Kolasch & Birch, LLP

(57) ABSTRACT

A resolver comprises excitation windings for receiving excitation signals and a detection winding for outputting a detection signal. Displacement of a passive member provided with the excitation windings or the detection winding is detected on the basis of the detection signal which varies with the displacement of the passive member. A modulated signal obtained through modulation of a high-frequency signal by an excitation signal is input to each of the excitation windings, and a detection signal is obtained through demodulation of a modulated signal output from the detection winding. Since the modulated signal obtained through modulation (amplitude modulation) of the high-frequency signal by means of the excitation signal is applied to the excitation windings, the number of turns in the excitation and the detection windings can be reduced.

18 Claims, 5 Drawing Sheets

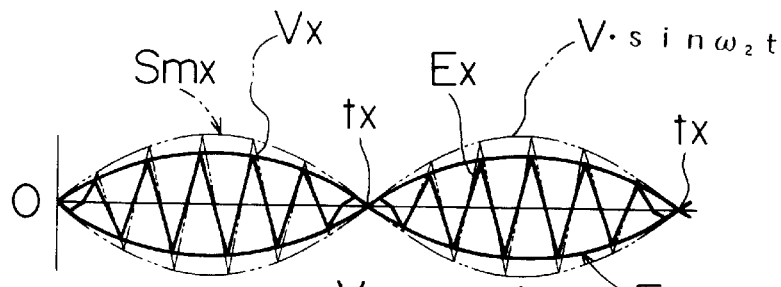
FIG.2(a)
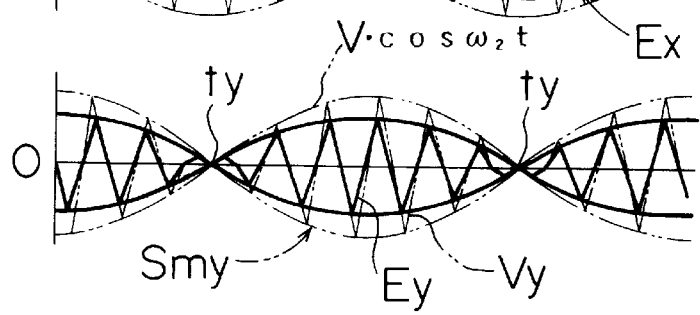
FIG.2(b)
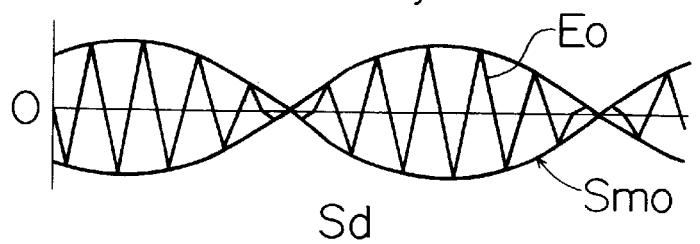
FIG.2(c)
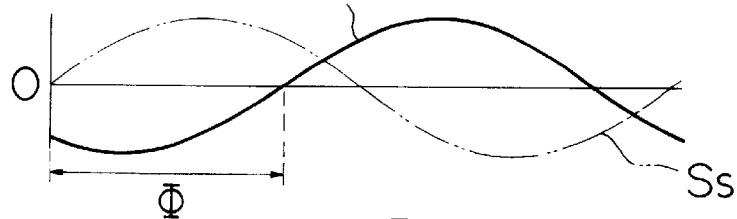
FIG.2(d)
FIG.2(e)
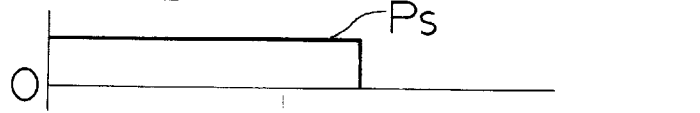
FIG.2(f)
FIG.2(g)
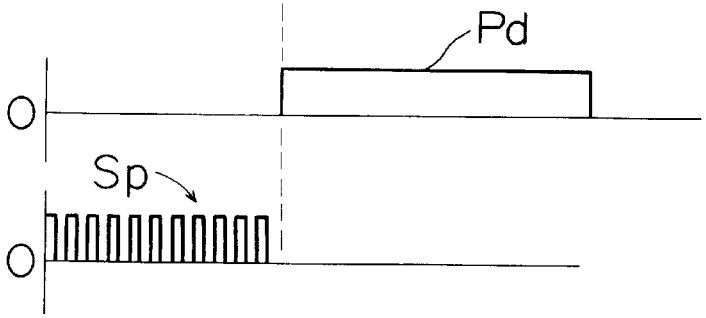

FIG.3
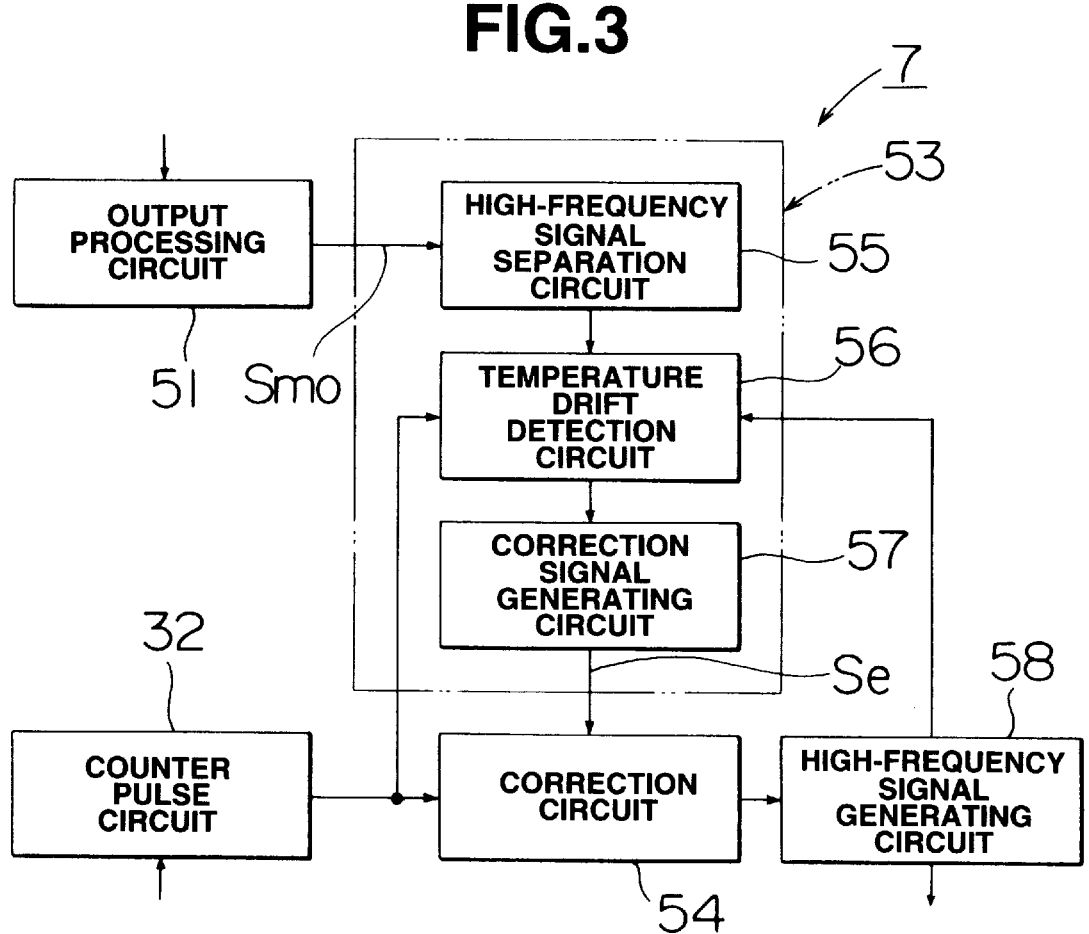
FIG.4(a)
FIG.4(b)
FIG.4(c)
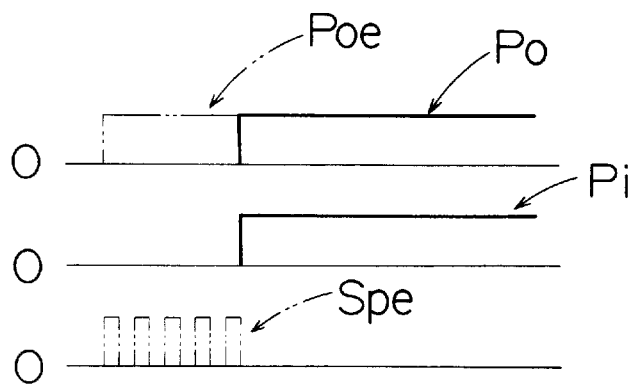

RESOLVER

BACKGROUND OF THE INVENTION

1. Field of the Invention

The present invention relates to a resolver comprising excitation windings and a detection winding and adopted to detect displacement of a passive member provided with the excitation windings or the detection winding.

2. Description of the Related Art

Conventionally, a resolver used for detection of a rotational angle (displacement) of a rotational member is widely known (see Japanese Patent Publication (kokoku) No. 17781/1984 and Japanese Patent Application Laid-Open (kokai) No. 144021/1987).

Such a resolver comprises two excitation windings fixedly provided at spatial positions separated by a phase difference of 90 degrees in electrical angle, and a detection winding provided on a rotation shaft. Excitation signals are input to the excitation windings, and a detection signal is output from the detection winding. Thus, the rotational angle of the rotation shaft is detected from the phase difference between one of the excitation signals and the detection signal. When the rotational angle of the rotation shaft is represented as Φ, the phase of one excitation winding becomes sinΦ, and the phase of the other excitation winding becomes cosΦ. When the excitation signals V·sinωt and V·cosωt having a phase difference of 90 degrees therebetween are input to the respective excitation windings, the detection signal output from the detection winding is represented by the following equation:

$$E=(V\cdot\sin\omega t\cdot\cos\Phi)+(V\cdot\cos\omega t\cdot\sin\Phi)=V\cdot\sin(\omega t+\Phi).$$

Thus, the phase of the detection signal varies in correspondence with the rotational angle of the rotation shaft. In this way, the rotational angle Φ of the rotation shaft can be obtained from the phase difference between one of the excitation signals and the detection signal.

Since such a resolver requires a high degree of accuracy in detecting the rotational angle, various factors are taken into consideration in its design, such that an accurate function is established. For example, when the resolver has a bipolar configuration, each rotation of the rotation shaft coincides with a cycle of the excitation signal. Therefore, generally, a resolver having a multipolar configuration is used in order to increase angular resolution. Further, since a laminated silicon steel plate in which a plurality of winding slots are formed is used for a stator provided with excitation windings and for a rotor iron core (rotation shaft) provided with a detection winding, a uniform pitch and a uniform gap on magnetic circuits are ensured through precise machining and accurate winding technique.

However, precise machining and accurate winding technique involve not only a limit to improving detection accuracy of rotational angle, but also a considerable increase in cost.

Excitation signals of a higher frequency can reduce the number of turns in the windings. Such an angle detector having a reduced number of turns is generally known as an inductosyn, in which signals of high frequency ranging from several tens to hundreds of KHz are used in order to reduce the number of turns. However, when this technique is applied to a resolver, the high frequency makes it difficult in practice to configure an electric circuit for detection of rotational angle of the rotation shaft, from the viewpoints of accuracy, cost, and stability. Therefore, the frequency employed in a typical resolver of high precision is therefore set to several KHz.

Ultimately, since a conventional resolver requires windings each having a large number of turns and requires a high degree of accuracy in machining and winding as well, there is a limit to reduction in size and weight. Further, there is a drawback in that component (materials) costs and manufacturing costs increase. Such being the case, from a point of view of compromise, improvement in detection accuracy cannot be achieved.

SUMMARY OF THE INVENTION

An object of the present invention is to provide a resolver having a design that causes modulated high-frequency current to flow through excitation windings so as to enable induction of a sufficiently high voltage in a detection winding even though each of the excitation and detection windings is a sheet coil having a small number of turns, whereby the size, weight, and cost of the resolver can be reduced through employment of a sheet coil.

Another object of the present invention is to provide a resolver which utilizes a sheet coil in order to form precise windings while realizing a multipolar structure and which, through employment of excitation signals of a low frequency, facilitates and stabilizes signal processing performed after demodulation, to thereby increase detection accuracy.

In order to achieve the above-described objects, the present invention provides a resolver which comprises excitation windings for receiving excitation signals and a detection winding for outputting a detection signal, and in which displacement of a passive member provided with the excitation windings or the detection winding is detected on the basis of the detection signal which varies with the displacement of the passive member, the resolver being characterized in that a modulated signal obtained through modulation of a high-frequency signal by an excitation signal is input to each of the excitation windings, and a detection signal is obtained through demodulation of a modulated signal output from the detection winding. Since the modulated signal obtained through modulation (amplitude modulation) of the high-frequency signal by means of the excitation signal is applied to the excitation windings, the number of turns in the excitation and the detection windings can be reduced.

BRIEF DESCRIPTION OF THE DRAWINGS

FIG. 2(a) through 2(g) are timing charts of signals in respective portions of the resolver;

FIG. 3 is a block diagram of a phase correction circuit in the resolver;

FIG. 4(a) through 4(c) are timing charts of the signals in the phase correction circuit;

DETAILED DESCRIPTION OF THE PREFERRED EMBODIMENTS

Embodiments of the present invention will now be described in detail with reference to the drawings. The accompanying drawings are illustrative of the embodiments and are not meant to limit the scope of the invention. To clarify the invention, the detailed description of known parts is omitted.

First, the configuration of a resolver 1 according to one embodiment will be described by reference to FIG. 1 through FIG. 6.

Figure 1:
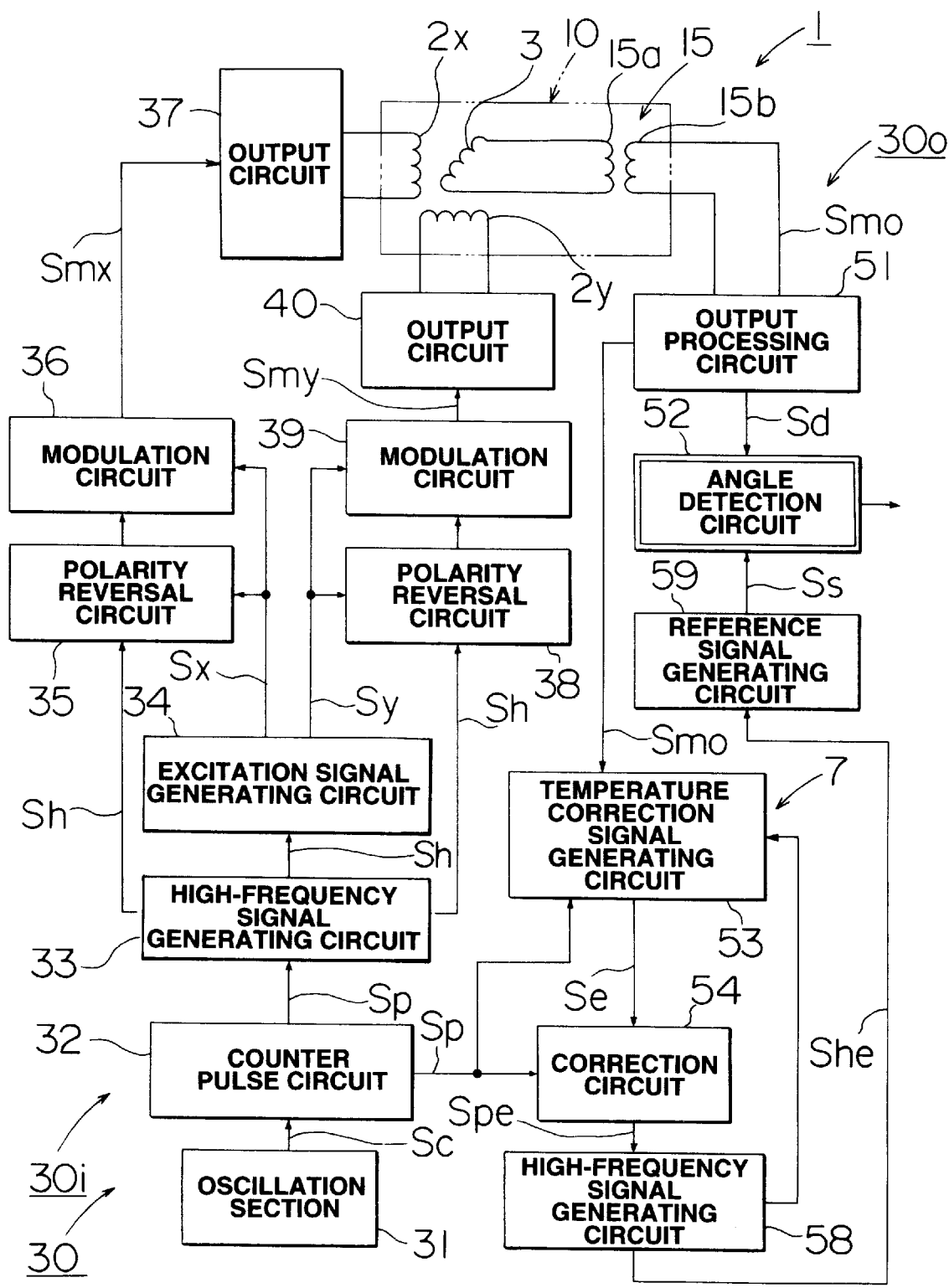
FIG. 1 is a block diagram of a resolver according to a preferred embodiment of the present invention.
Figure 5:
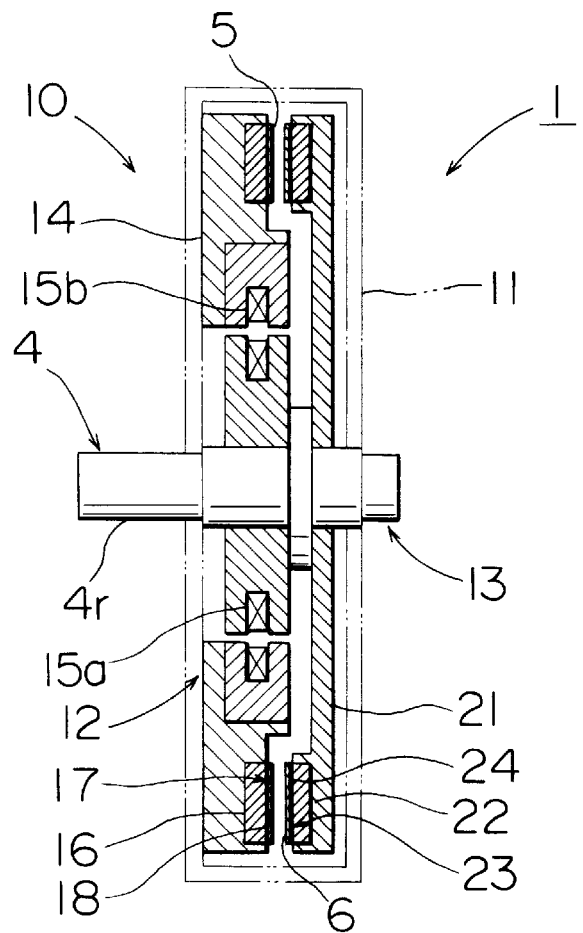
FIG. 5 is a sectional side view of a resolver main body.
Figure 6:
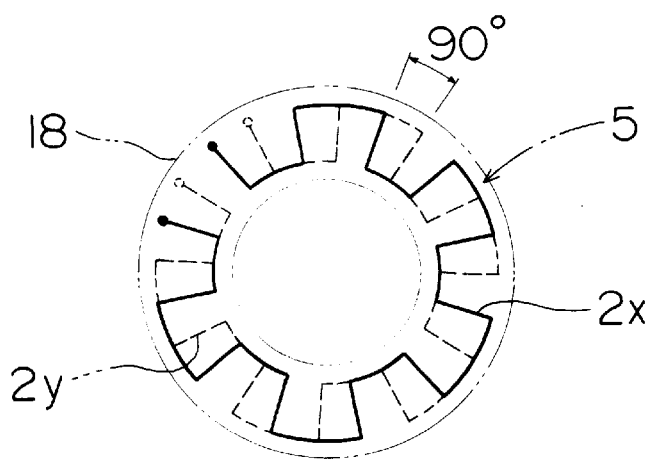
FIG. 6 is a front view showing an excitation-side sheet coil of the resolver.

In FIG. 1, reference numeral 10 denotes a resolver main body, a detailed configuration of which is shown in FIG. 5 and FIG. 6. The resolver main body 10 comprises a stator 12 fixed in a casing 11 shown by an imaginary line and a rotor 13 rotatably supported at the center of the casing 11.

The stator 12 has a doughnut-shaped base 14 fixed to the casing 11. A secondary winding 15b of an output transformer 15 (FIG. 1) is provided on a radially inner portion of the base 14; a doughnut-shaped iron core 16 is fixed onto one side surface of a radially outer portion of the base 14; and a sheet coil board (printed circuit board) 17 is fixed to the face of the iron core 16. As shown in FIG. 6, the sheet coil board 17 has a doughnut-shaped insulating plate 18 and a sheet coil 5 formed on the face of the insulating plate 18. The sheet coil 5 has excitation windings 2x and 2y to which modulated signals Smx and Smy (excitation signals Sx and Sy) are input, respectively. The excitation windings 2x and 2y are insulated and placed at spatial positions such that the excitation windings 2x and 2y have a phase difference of 90 degrees in electrical angle therebetween.

The rotor 13 comprises a rotation shaft 4r (passive member 4), a rotating plate 21 fixed to the rotation shaft 4r, and a primary winding 15a of the output transformer 15 (FIG. 1). A doughnut-shaped iron core 22 is fixed onto one surface of the rotating plate 21. Further, a detection-side sheet coil board (printed circuit board) 23 is fixed onto the face of the iron core 22, so that the sheet coil board 23 faces the above-described sheet coil 5. The sheet coil board 23 has a doughnut-shaped insulating plate 24 and a sheet coil 6 formed on the face of the insulating plate 24. Ends of the sheet coil 6 are connected to the primary winding 15a. The sheet coil 6 serves as a detection winding 3 from which a modulated signal Smo (detection signal Sd) is output. The configuration of the sheet coil board 23 (sheet coil 6) is substantially identical with that of the sheet coil 17 (sheet coil 5) shown in FIG. 6, excluding the excitation winding 2x (or 2y).

An electronic circuit section 30 shown in FIG. 1 is connected to the resolver main body 10. Reference numeral 30i denotes an input-side circuit which comprises an oscillation section 31, a counter pulse circuit 32, a high-frequency signal generating circuit 33, an excitation signal generating circuit 34, polarity reversal circuits 35 and 38, modulation circuits 36 and 39, and output circuits 37 and 40. The oscillation section 31 generates a clock signal Sc by use of a crystal resonator. The counter pulse circuit 32 generates counter pulses Sp in accordance with the clock signal Sc output from the oscillation section 31. In accordance with the counter pulses Sp output from the counter pulse circuit 32, the high-frequency signal generating circuit 33 generates a high-frequency signal Sh having a frequency of about 1 MHz. On the basis of the high-frequency signal Sh output from the high-frequency signal generating circuit 33, the excitation signal generating section 34 generates excitation signals Sx and Sy each having a frequency of about 1 KHz. One of the excitation signals; e.g., the excitation signal Sx, output from the excitation signal generating circuit 34 is input to the polarity reversal circuit 35, where the polarity of the high-frequency signal Sh obtained from the high-frequency signal generation circuit 33 is reversed whenever the polarity of the excitation signal Sx reverses. Then, the high-frequency signal Sh is output from the polarity reversal circuit 35. The modulation circuit 36 modulates the high-frequency signal Sh in accordance with the excitation signal Sx. The output circuit 37 supplies to the excitation winding 2x the modulated signal Smx output from the modulation circuit 36. The other excitation signal Sy output from the excitation signal generating circuit 34 is input to the polarity reversal circuit 38, where the polarity of the high-frequency signal Sh obtained from the high-frequency signal generation circuit 33 is reversed whenever the polarity of the excitation signal Sy reverses. Then, the high-frequency signal Sh is output from the polarity reversal circuit 38. The modulation circuit 39 modulates the high-frequency signal Sh in accordance with the excitation signal Sy. The output circuit 40 supplies to the excitation winding 2y the modulated signal Smy output from the modulation circuit 39.

Reference numeral 300 denotes an output-side circuit, which comprises an output processing circuit 51 and an angle detection circuit 52. The output processing circuit 51 is connected to the secondary winding 15b of the output transformer 15 and is adapted to demodulate a modulated signal Smo output from the secondary winding 15b. The thus-obtained detection signal Sd is input to the angle detection circuit 52.

Reference numeral 7 denotes a phase correction circuit for compensating for a phase error produced between the excitation signals Sx and Sy and the detection signal Sd. The phase correction circuit 7 comprises a temperature correction signal generating section 53 and a correction circuit 54. The temperature correction signal generating section 53 generates a correction signal Se on the basis of temperature drift. The correction circuit 54 corrects the counter pulses Sp output from the counter pulse circuit 32 in accordance with the correction signal Se output from the temperature correction signal generating section 53. In this case, as shown in FIG. 3, the temperature correction signal generating section 53 comprises a high-frequency signal separation circuit 55, a temperature drift detection circuit 56, and a correction signal generating circuit 57. The high-frequency signal separation circuit 55 separates a high-frequency signal component from a modulated signal Smo output from the secondary winding 15b (output processing circuit 51). The temperature drift detection circuit 56 detects an error component of the high-frequency signal component attributable to temperature drift, on the basis of the high-frequency signal component output from the high-frequency signal separation circuit 55, the counter pulses Sp output from the counter pulse circuit 32, and a high-frequency signal output from a high-frequency signal generating circuit 58. The correction signal generating circuit 57 generates the above-mentioned correction signal Se on the basis of the error component output from the temperature drift detection circuit 56. The corrected counter pulses Spe output from the correction circuit 54 are then input to the high-frequency signal generating circuit 58, which generates a high-frequency signal She on the basis of the corrected counter pulses Spe. The high-frequency signal She output from the high-frequency signal generating section 58 is input to a reference signal generating circuit 59 for generating a reference signal Ss. The reference signal Ss is then input to the angle detection circuit 52.

The operation of the resolver 1 according to the present embodiment having the above configuration will next be described.

First, a clock signal Sc is output from the oscillation section 31, and is then input to the counter pulse circuit 32.

The counter pulse circuit 32 generates counter pulses Sp (see FIG. 2(g)) in accordance with the clock signal Sc. The counter pulses Sp are input to the high-frequency signal generating circuit 33, the temperature drift detection circuit 56 of the temperature correction signal generating section 53, and the correction circuit 54. A high-frequency signal Sh having a frequency of about 1 MHz is generated in the high-frequency signal generating circuit 33 in accordance with the counter pulses Sp. The high-frequency signal Sh is then input to the excitation signal generating circuit 34, where excitation signals Sx and Sy each having a frequency of about 1 KHz are generated on the basis of the high-frequency signal Sh.

In this case, one of the generated excitation signals; e.g., the excitation signal Sx, is represented as $V \cdot \sin\omega_2 t$ (an envelope indicated by an imaginary line in FIG. 2). The excitation signal Sx is supplied to the modulation circuit 36 and the polarity reversal circuit 35. In the modulation circuit 36, a high frequency signal Sh supplied from the polarity reversal circuit 35 is amplitude-modulated in accordance with the excitation signal Sx, to thereby obtain a modulated signal Smx. The modulated signal Smx is then supplied to the excitation winding 2x via the output circuit 37. In this case, the polarity of the high-frequency signal Sh supplied from the high-frequency signal generating circuit 33 is reversed by the polarity reversal circuit 35 at every polarity reversal position tx of the excitation signal Sx. The high-frequency signal Sh is then fed to the modulation circuit 36. The modulated signal Smx which is to be supplied to the excitation winding 2x is indicated by an imaginary line in FIG. 2(a). The voltage of the modulated signal Smx is represented by the following equation:

$$Vx = (V \cdot \sin\omega_2 t) \times (\pm \sin\omega_1 t),$$

where $\omega_1$ represents the angular velocity of the high-frequency signal Sh.

The other excitation signal Sy generated in the excitation signal generating circuit 34 is represented as $V \cdot \cos\omega_2 t$ (an envelope indicated by an imaginary line in FIG. 2(b)), where V represents the maximum voltage and $\omega_2$ represents angular velocity. The excitation signal Sy is supplied to the modulation circuit 39 and the polarity reversal circuit 38. In the modulation circuit 39, the high frequency signal Sh supplied from the polarity reversal circuit 34 is amplitude-modulated in accordance with the excitation signal Sy supplied from the excitation signal generation circuit 34, to thereby obtain a modulated signal Smy. The modulated signal Smy is then supplied to the excitation winding 2y via the output circuit 40. In this case, the polarity of the high-frequency signal Sh supplied from the high-frequency signal generating circuit 33 is reversed by the polarity reversal circuit 38 at every polarity reversal position ty of the excitation signal Sy. The high-frequency signal Sh having its polarity reversed is then supplied to the modulation circuit 39. The modulated signal Smy which is to be supplied to the excitation winding 2y is indicated by an imaginary line in FIG. 2(b). The voltage of the modulated signal Smy is represented by the following formula:

$$Vy = (V \cdot \cos\omega_2 t) \times (\pm \sin\omega_1 t),$$

It is assumed, for example, that the rotation shaft 4r is rotated 45 degrees. In this case, a combined voltage Eo of a voltage Ex induced in the detection winding 3 in accordance with the excitation signal Sx and a voltage Ey induced in the detection winding 3 in accordance with the excitation signal Sy is output from the detection winding 3 to thereby generate the modulated signal Smo. The voltage Ex is shown in FIG. 2(a) by a solid line and is represented by $Ex = (V \cdot \sin\omega_2 t) \times \cos|45°|$; the voltage Ey is shown in FIG. 2(b) by a solid line and is represented by $Ey = (V \cdot \cos\omega_2 t) \times \sin|45°|$; and the combined voltage Eo is shown in FIG. 2(c) by a solid line and is represented by $Eo = Ex + Ey = (V \cdot \sin\omega_2 t) \times \cos|450°| + (V \cdot \cos\omega_2 t) \times \sin|45°|$. The modulated signal Smo is fed via the output transformer 15 to the output processing circuit 51, as well as to the high-frequency signal separation circuit 55. The modulated signal Smo is demodulated (detected) in the output processing circuit 51 to thereby obtain a detection signal Sd as shown in FIG. 2(d). The thus-obtained detection signal Sd is then supplied to the angle detection circuit 52.

In the high-frequency signal separation circuit 55, a high-frequency signal component is separated from the modulated signal Smo. The thus-separated high-frequency signal component is fed to the temperature drift detection circuit 56. An error component of the high-frequency signal component attributable to temperature drift is detected in the temperature drift detection circuit 56 on the basis of the high-frequency signal component obtained from the high-frequency signal separation circuit 55, counter pulses Sp obtained from the counter pulse circuit 32, and a high-frequency signal obtained from the high-frequency signal generating circuit 58. Further, a correction signal Se is generated in the correction signal generating circuit 57 on the basis of the error component. The thus-generated correction signal Se is fed to the correction circuit 54. Then, in the correction circuit 54, the counter pulses Sp supplied from the counter pulse circuit 32 are corrected by the correction signal Se.

In the present embodiment, temperature compensation is performed while taking advantage of the fact that the phase of the high-frequency signal Sh does not change with rotation of the rotation shaft 4r. The principle of the compensation is as follows. Generally, phase change with temperature change is caused by various factors, including electrical factors such as variation in the circuit constants caused by variation in winding resistance and permeability of magnetic circuits. Since current which flows through the circuits is of high frequency, variation in circuit constants results in a "phase shift" between the high-frequency input and output signals. Because the high-frequency signals are not affected by rotations of the rotation shaft 4r, the "phase shift" can be eliminated through detection of and compensation for the "phase shift." Specifically, there is assumed a case where, at a rotational angle of zero, an output pulse Po obtained from the high-frequency signal components from the high-frequency signal separation circuit 55 assumes a waveform as shown in FIG. 4(a), including the region shown by an imaginary line. Counter pulses Spe shown in FIG. 4(c) which correspond to an error component Poe shown by an imaginary line in FIG. 4(a) are determined, as a correction signal Se, from the output pulses Po and an input pulse Pi (shown in FIG. 4(b)) obtained from the counter pulses Sp from the counter pulse circuit 32. Then, the counter pulses Sp supplied from the counter pulse circuit 32 to the correction circuit 54 is corrected by the correction signal Se. Consequently, the error component stemming from temperature drift is eliminated.

The corrected counter pulses Spe obtained from the correction circuit 54 are fed to the high-frequency signal generating circuit 58, where a high-frequency signal She is generated on the basis of the counter pulses Spe. The high-frequency signal She obtained from the high-frequency signal generating circuit 58 is fed to the reference signal generating circuit 59, where a reference signal Ss shown in FIG. 2(d) is generated on the basis of the high-frequency signal She. The reference signal Ss is then fed to the angle detection circuit 52. In the angle detection circuit 52, a reference pulse Ps shown in FIG. 2(e) is generated from the reference signal Ss, and a detection pulse Pd shown in FIG. 2(f) is generated from the detection signal Sd. The counter pulses Sp are counted during a period from a leading edge of the reference pulse Ps and a corresponding leading edge of the detection pulse Pd. The counted number of the counter pulses Sp is converted to an angle, from which the rotational angle of the rotation shaft 4r is determined. In this case, the relation between the counted number and the rotational angle may be stored in the form of a database in advance so that a rotational angle corresponding to a certain counted number can be read out therefrom. Alternatively, the rotational angle may be calculated through use of a predefined function. In the present embodiment, a rotational angle of 45 degrees is obtained.

As has been described, in the resolver 1 according to the present embodiment, the excitation windings 2x and 2y are excited by modulated signals Smx and Smy, respectively. In this case, since the modulated signals Smx, Smy, and Smo flowing through the excitation windings 2x and 2y and the detection winding 3 are of high frequency, a sufficiently high voltage is induced in the detection winding 3 even though sheet coils 5 and 6 having a small number of turns are used. Consequently, through use of the sheet coils 5 and 6, the size, weight, and cost of the resolver 1 can be reduced. Further, use of the sheet coils 5 and 6 enables formation of precise windings and realizes a precise multipolar configuration. Moreover, since processing of signals after demodulation thereof is facilitated and stabilized by the use of the excitation signals 2x and 2y of low frequency, detection accuracy can be improved.

Next, a resolver 1 according to a modified embodiment of the present invention will be described by reference to FIG. 7.

Figure 7:
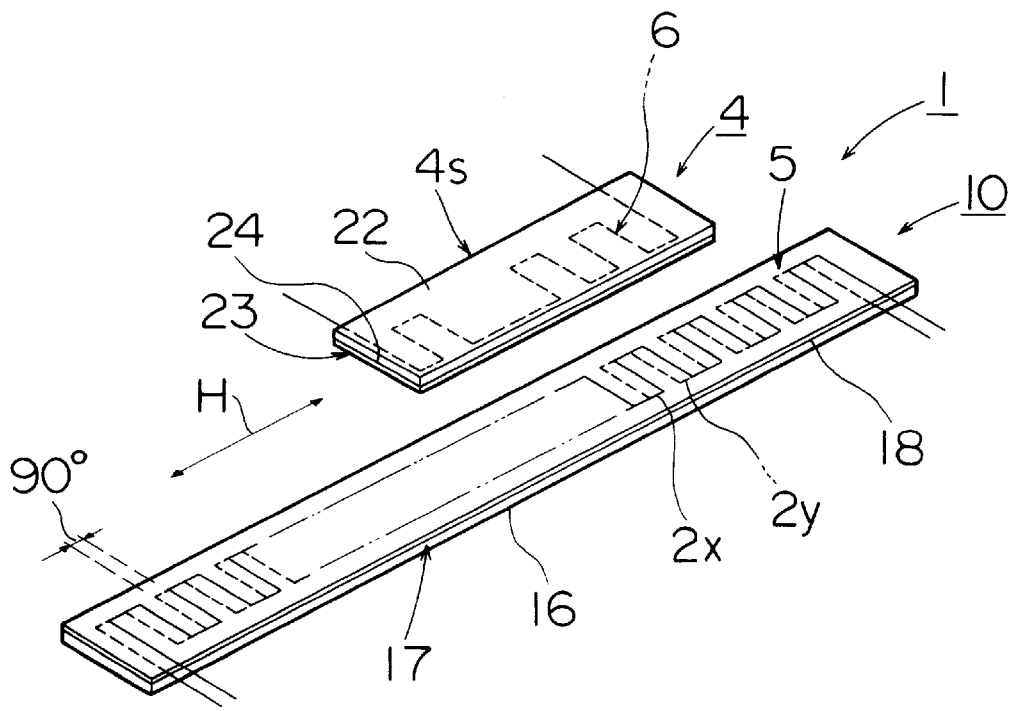
FIG. 7 is an exploded perspective view showing a resolver main body according to a modified embodiment of the present invention.

The resolver 1 shown in FIG. 7 comprises a linear movable member 4s which serves as the passive member 4 in the previous embodiment, and is capable of detecting the amount of movement in the linear motion direction H of the linear moving member 4s. A resolver main body 10 shown in FIG. 7 comprises a stator 12 fixed to an unillustrated casing and a rotor 13 supported by the casing to be linearly movable in direction H. The stator 12 has a flat iron core 16, on the face of which is fixed an excitation-side sheet coil board (print circuit board) 17. The sheet coil board 17 has an insulating plate 18 and a sheet coil 5 formed on the surface of the insulating plate 18. The sheet coil 5 includes excitation windings 2x and 2y, to which excitation signals Smx and Smy (excitation signals Sx and Sy) are input, respectively. The excitation windings 2x and 2y are insulated and are disposed such that a phase difference of 90 degrees in electrical angle is present therebetween. The rotor 13 has a flat iron core 22 (linear movable member 4s) and a detection-side sheet coil board (printed circuit board) 23 fixed on the face of the flat iron core 22, so that the sheet coil board 23 faces the sheet coil 5. The sheet coil board 23 has an insulating plate 24 and a sheet coil 6 formed on the face of the insulating plate 24. The sheet coil 6 serves as a detection winding 3 from which a modulated signal Smo (detection signal Sd) is output.

An electrical circuit section similar to the electrical circuit section 30 shown in FIG. 1 is connected to the resolver main body 10 having the above-described configuration. The resolver 1 shown in FIG. 7 is identical in terms of basic principle with the resolver 1 shown in FIG. 1 through FIG. 6, except that the former is of a linear type and the latter is of a rotary type. For clarity, portions in FIG. 7 which function on the basis of a principle identical with that in FIG. 5 and FIG. 6 are designated with identical numbers, and detailed descriptions of these portions are omitted.

The present invention is not limited to the above-described embodiment. Regarding structural details, approaches, and the like, modifications and any omission or addition may be possible as needed without departing from the scope of the invention. For example, there may be employed a configuration in which a modulated signal is input to the excitation winding 3 and outputs are obtained from the excitation windings 2x and 2y in order to determine an angle from the output voltage ratio between sinΦ and cosΦ. In the present invention, even though a high-frequency signal Sh is amplitude-modulated by excitation signals Sx and Sy so as to generate modulated signals Smx and Smy, other modulation schemes, such as phase modulation, can be employed. Further, any type of windings other than the sheet coils 5 and 6, such as commonly used coils, can be employed for the excitation windings 2x and 2y and/or the detection winding 3.

What is claimed is:

1. A resolver comprising excitation windings for receiving excitation signals and a detection winding formed by use of a sheet coil for outputting a detection signal, in which displacement of a passive member provided with said excitation windings or said detection winding is detected on the basis of the detection signal which varies with the displacement of said passive member, wherein a modulated signal obtained through modulation of a high-frequency signal by an excitation signal is input to each of said excitation windings, and a detection signal is obtained through demodulation of a modulated signal output from said detection winding.

2. The resolver according to claim 1, wherein said excitation windings are each formed by use of a sheet coil.

3. The resolver according to claim 1, wherein said passive member is a rotation shaft, and the rotational angle of said rotation shaft is detected.

4. The resolver according to claim 1, wherein said excitation windings are fixedly provided; said detection winding is provided on a rotation shaft; and the rotational angle of said rotation shaft is detected on the basis of a phase difference between said excitation signals and said detection signal.

5. The resolver according to claim 4, wherein said excitation windings are each formed by use of a sheet coil.

6. The resolver according to claim 4, wherein said detection winding is formed by use of a sheet coil.

7. The resolver according to claim 1, wherein said passive member is a linearly movable member, and an amount of movement of said movable member is detected.

8. The resolver according to claim 1, wherein said modulated signal is obtained though amplitude modulation of said high-frequency signal in accordance with said excitation signal.

9. The resolver according to claim 8, wherein the polarity of said high-frequency signal is reversed whenever the polarity of said excitation signal reverses.

10. The resolver according to claim 1, further comprising a phase correction circuit for correcting a phase error produced between said excitation signals and said detection signal.

11. A resolver comprising excitation windings for receiving excitation signals and a detection winding formed by use of a sheet coil for outputting a detection signal, in which displacement of a passive member provided with said excitation windings or said detection winding is detected on the basis of the detection signal which varies with the displacement of said passive member, wherein a modulated signal obtained through modulation of a high-frequency signal by an excitation signal is input to each of said excitation windings, and a detection signal is obtained through demodulation of a modulated signal output from said detection winding; and wherein said excitation windings are fixedly provided; said detection winding is provided on a rotation shaft; and the rotational angle of said rotation shaft is detected on the basis of a phase difference between said excitation signals and said detection signal.

12. The resolver according to claim 11, wherein said excitation windings are each formed by use of a sheet coil.

13. The resolver according to claim 11, wherein said passive member is a rotation shaft, and the rotational angle of said rotation shaft is detected.

14. The resolver according to claim 11, wherein said excitation windings are fixedly provided; said detection winding is provided on a rotation shaft; and the rotational angle of said rotation shaft is detected on the basis of a phase difference between said excitation signals and said detection signal.

15. The resolver according to claim 11, wherein said passive member is a linearly movable member, and an amount of movement of said movable member is detected.

16. The resolver according to claim 11, wherein said modulated signal is obtained through amplitude modulation of said high-frequency signal in accordance with said excitation signal.

17. The resolver according to claim 16, wherein the polarity of said high-frequency signal is reversed whenever the polarity of said excitation signal reverses.

18. The resolver according to claim 11, wherein a phase correction circuit for correcting a phase error produced between said excitation signals and said detection signal.

* * * * *